(12) United States Patent
Simon

(10) Patent No.: US 12,654,271 B2
(45) Date of Patent: Jun. 16, 2026

(54) DRILL ATTACHMENT DEVICE FOR PARTICLE COLLECTION

(71) Applicant: New Age Entrepreneur LLC, Port St. Lucie, FL (US)

(72) Inventor: Sedric L. Simon, Port St. Lucie, FL (US)

(73) Assignee: New Age Entrepreneur, LLC, Port St. Lucie, FL (US)

( * ) Notice: Subject to any disclaimer, the term of this patent is extended or adjusted under 35 U.S.C. 154(b) by 602 days.

(21) Appl. No.: 18/174,862

(22) Filed: Feb. 27, 2023

(65) Prior Publication Data

US 2024/0286206 A1 Aug. 29, 2024

(51) Int. Cl.
B23Q 11/00 (2006.01)
(52) U.S. Cl.
CPC ...... B23Q 11/0071 (2013.01); B23Q 11/0046 (2013.01); Y10T 408/50 (2015.01)
(58) Field of Classification Search
CPC ............ B23Q 11/0046; B23Q 11/0053; B23Q 11/0071; Y10T 408/50
See application file for complete search history.

(56) References Cited

U.S. PATENT DOCUMENTS

| | | | | | |
|---|---|---|---|---|---|
| 2,990,024 | A | * | 6/1961 | Van ........................ | E21B 21/015 175/213 |
| 3,583,821 | A | * | 6/1971 | Shaub ................ | B23Q 11/0816 408/72 R |
| 3,757,891 | A | * | 9/1973 | Krieger .................. | G10K 11/16 181/205 |
| 5,653,561 | A | * | 8/1997 | May .................... | B23Q 11/0046 408/72 R |
| 6,164,881 | A | * | 12/2000 | Shono ................ | B23Q 11/0816 409/137 |
| 7,322,429 | B2 | * | 1/2008 | Kim .................... | B23Q 11/0042 173/171 |
| 7,396,193 | B2 | * | 7/2008 | Kesten ............... | B23Q 11/0046 408/67 |
| 7,901,164 | B2 | * | 3/2011 | Skradski ............ | B23Q 11/0046 408/112 |
| 2007/0243031 | A1 | * | 10/2007 | Yun ........................ | B23B 47/00 408/67 |

FOREIGN PATENT DOCUMENTS

| | | | | | |
|---|---|---|---|---|---|
| DE | 2434641 | A1 | * | 1/1976 | |
| FR | 2763528 | A1 | * | 11/1998 | ......... B23Q 11/0046 |
| JP | 2007168186 | A | * | 7/2007 | |
| JP | 2009202256 | A | * | 9/2009 | |

* cited by examiner

*Primary Examiner* — Eric A. Gates

(74) *Attorney, Agent, or Firm* — McHale & Slavin, P.A.

(57) ABSTRACT

A drilling attachment device for particle collection. The device has a bell-shaped housing designed to be attached to the front of an electric drill. The housing is transparent and is releasably attached to the torque collar of an electric drill using a clamp and thumbscrew. The device is used to collect and contain dust and debris while drilling into various materials providing both safety and convenience benefits.

6 Claims, 5 Drawing Sheets

DRILL ATTACHMENT DEVICE FOR PARTICLE COLLECTION

FIELD OF THE INVENTION

The present invention relates to the field of construction and, more particularly, to a drilling attachment device for particle collection during a drilling procedure.

BACKGROUND OF THE INVENTION

Even the most basic form of construction requires the destruction or manipulation of structures or building material. By doing so many of the elements that make up the structure or material being altered are being released or exposed. If these elements are not safely contained, they can be very harmful to the individual (s) performing the construction activity. The very nature of the electric drill not only destroys a small area of a surface, but it does so at a very high speed while blowing debris in every direction. In a matter of minutes an entire room can filled with debris from chemically treated building materials. Over the past few decades there have many attempts to try to contain the elements and dust that is being released from the action of drilling. Most being very limited to specific applications or positions.

Disston® E0215000 Blu-Mol RemGrit dust bowl is made specifically for hole saws. Hole saws defined as cylinders that have an opening on one end usually between 1 and 6 inches that is covered with sharp teeth. The cylinder is closed on the opposite end with a drill bit protruding from the center for coupling to an electric drill. The device is not compressible and does not attach to the drill requiring two hands for operation. The bowl is not cupped making it limited to vertical applications.

Another known device is sold as a Lionmount® clear drill dust collector. The dust collector is bell shaped and receives a drill bit between ¼" and ½. Rubber rings allow the drill bit to rotate while pressing against the dust collector.

Houkiper® drill dust collector is a scalable rubber device sold as an accessory for an electric drill. The device employs a bearing assembly to allow turning of the drill without heating of the dust collector.

The problem with drilling is the uncollected dust particles create a known health hazard. Many of the particles released during a drilling operation can lead to respiratory illnesses. For instance, Talcum Powder is an ultra-fine mineral known to be used as a joint compound because its plate-shaped particles lie flat and resist cracking. Breathing in talcum powder can lead to very serious lung problems, even death. Workers who have regularly breathed in talcum powder over long periods of time have developed lung damage and cancer. Calcium Carbonate (calcite) otherwise known as ground limestone is commonly used in drywall mud. Inhaling dust may cause discomfort in the chest, shortness of breath, and coughing. Prolonged inhalation may cause chronic health effects. This product contains crystalline silica. Prolonged or repeated inhalation of respirable crystalline silica liberated from this product can cause silicosis and cancer. Micas are a group of silicate minerals whose outstanding physical characteristic is that individual mica crystals can easily be split into extremely thin elastic plates. Gypsum plaster has long been the mainstay of drywall products. Otherwise known as calcium sulfate, gypsum is cheap to mine, is fire-proof, and it provides superior sound-deadening properties. Depending on the source of the gypsum, drywall may contain heavy metals, including mercury, a known neurotoxin. This is particularly a problem with synthetically produced gypsum.

Studies have shown that drywall made from coal waste can emit levels of mercury that are more than 10 times higher than that from mined gypsum. Although it may seem like recycling materials is a good thing, the mercury captured in power plant waste is released into the air in significant quantities from factories making the drywall. For these reasons, drywall made from synthetic gypsum is not recommended and additives that do not contain any type of gypsum are available such as fiberglass. However, drilled fiberglass can remain in the lungs and thoracic region. While low levels of exposure will result in irritation, inhaling high levels of airborne fiberglass can cause bronchitis-like conditions. People with asthma may notice their symptoms worsening upon inhalation and can even result in an asthma attack.

What is lacking in the industry is a drilling attachment device for particle collection that secures to a portable drill torque adjustment allowing a flexible bell-shaped housing to be collect debris from drilling in a horizontal or vertical orientation.

SUMMARY OF THE INVENTION

A drilling attachment device for particle collection. The device is bell shaped and attached to the torque adjustment column of the electric drill by an adjustable ring that is tightened by a thumbscrew. Torque adjustment can be changed by simply turning the bell which turns the torque adjustment column. The drilling attachment bell shape is used to catch the dust particles created by the drilling action. The device is flexible allowing positioning against a surface such as a wall or ceiling. The drill is able to rotate freely within the bell-shaped device wherein attachment to the drill is along the torque adjustment column. A lip formed along an inner surface of the bell-shaped device is constructed and arranged to catch particle debris from leaving the device.

An objective of the instant invention is to minimize or prevent the inhalation of particles operating a drill during the drilling operation.

Another objective of the instant invention is to provide a device that will help a drill operator avoid inhaling toxic elements found in modern construction materials and released during a drilling procedure.

Still another objective of the invention is to prevent dust from falling into the eyes of the operator and causing limited visibility while operating at elevated heights or causing severe irritation and possible damage to the eyes.

Yet still another objective of the invention is to allow an operator to use any size drill bit for any application.

Still another objective of the invention is to save the operator time by eliminating the setup time of changing out components and eliminate the chance of losing critical components.

Yet another objective of the invention is to maximize stability and allow for one hand use.

Another objective of the invention is to eliminate the chance of overheating from the friction created by contact with moving parts.

And yet another objective of the invention is to allow for both vertical and horizontal drilling without out switching or adjusting the device.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
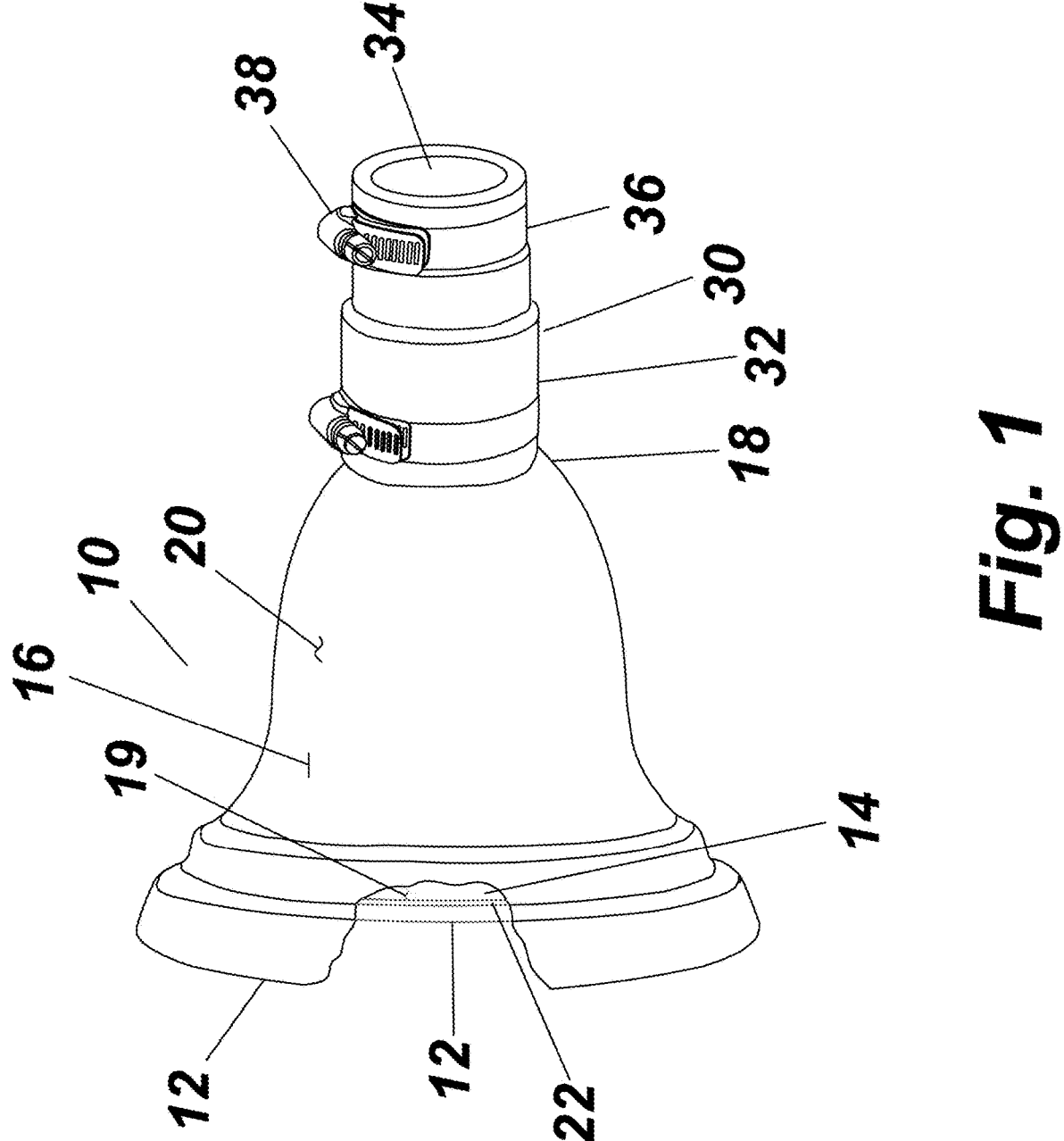
FIG. 1 is a perspective view of the bell-shaped housing.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

A bell-shaped housing 10 has a first end 12 forming an opening 14 designed to be pressed securely against any surface in order to surround a drilling area to catch particle debris and related dust that is created during the drilling process. The housing 10 having a continuous side wall 16 with a diminishing diameter extending from the first end 12 to a second end 18 having a diameter less than the first end 12. The housing 10 side wall 16 having an inner surface 19 and an outer surface 20 forming a thickness therebetween. The housing 10 is preferably constructed of a lightweight, transparent, flexible plastic or rubber. In one embodiment the material of construction is silicon rubber, in another embodiment the material of construction is acrylonitrile butadiene styrene (ABS), vinyl, or the like flexible material. The thickness of the housing 10 depends upon the material of construction.

The housing 10 including a lip 22 positioned adjacent the first end 12. The lip 22 extends inwardly from the inner surface 19 at least .25 inches and operates as a barrier to prevent particle debris from falling out of the housing when drilling in a horizontal orientation. In an alternative embodiment the lip 22 is angled causing the lip to angle toward the second end 18. The second end 18 is formed as a connection sleeve 30. In one embodiment the connection sleeve 30 is formed integral with the housing sidewall 16. In a second embodiment the connection sleeve 30 is a separate piece having a proximal end 32 that is secured to the second end 18 of the sidewall 16 by heat weldment or adhesive. The connection sleeve 30 having a distal end 34 for receipt of the front of a portable drill, depicted in FIG. 2. A clamp coupling 36 allows for the releasable attachment to said front end of the portable drill. The clamp coupling 36 having a thumb screw 38 allowing for attachment without the need for tools. The thumb screw 38 compresses the second end 18 of the housing to the portable drill.

Figure 2:
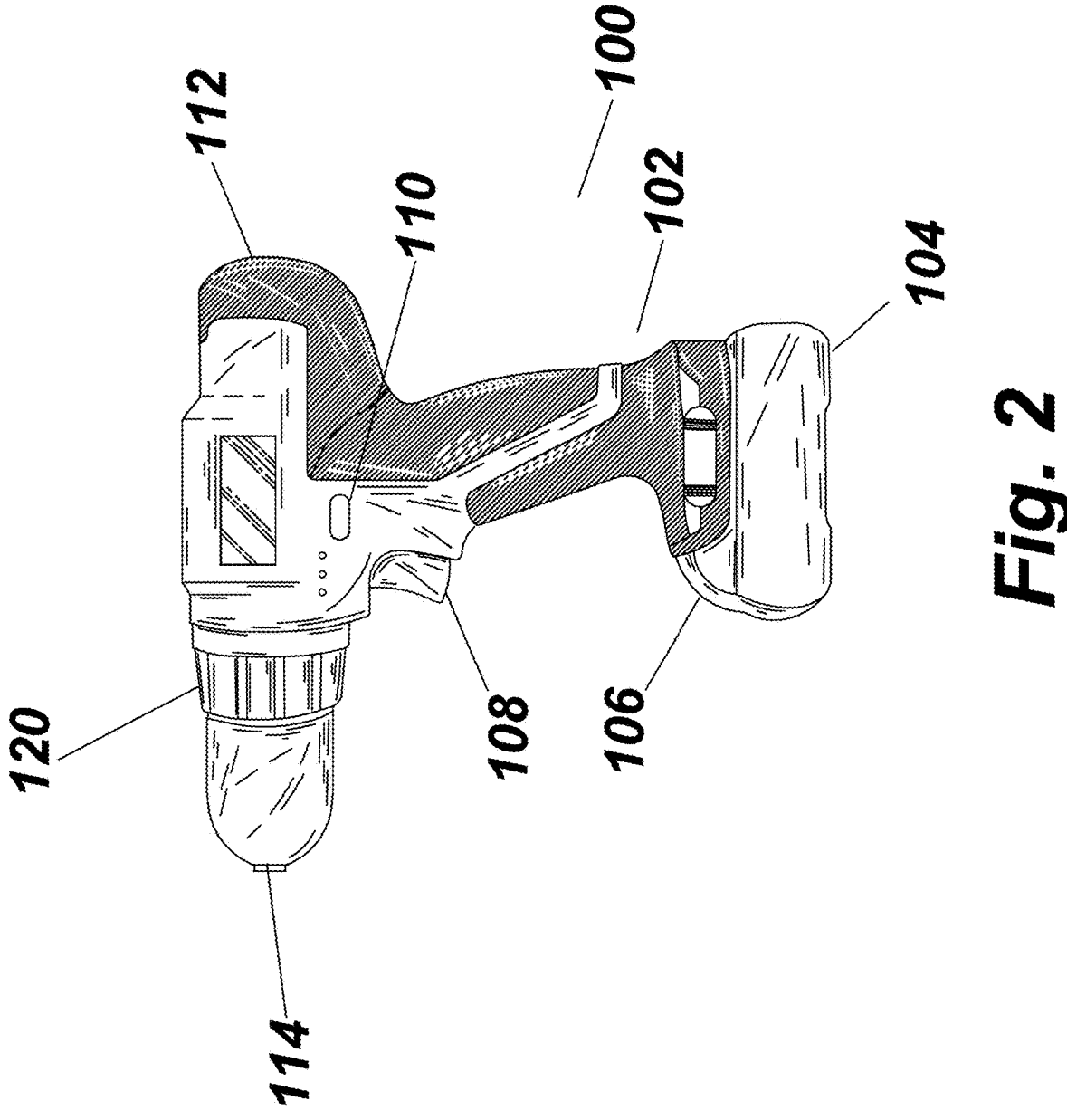
FIG. 2 is a perspective view of a conventional portable drill having a torque adjustment collar.

FIG. 2 depicts a conventional portable drill 100. The drill 100 comprising a handle 102 with a bottom mounted battery 104 and a battery release 106. The upper portion of the handle 102 includes a variable speed trigger 108 and a directional forward/reverse button actuator 110. The drive motor is placed within the upper section 112 for driving a keyless chuck 114. A torque adjustment collar 120 regulates the operational rotational force that can be applied to the chuck 114. In the conventional drill, the torque adjustment collar 120 does not rotate with the chuck 114. In the instant invention, the housing 50 is attached to the torque adjustment column 120 of the electric drill 100 which allows the operator the ability to change the torque of the drill by simply rotating the housing 10.

Figure 3A:
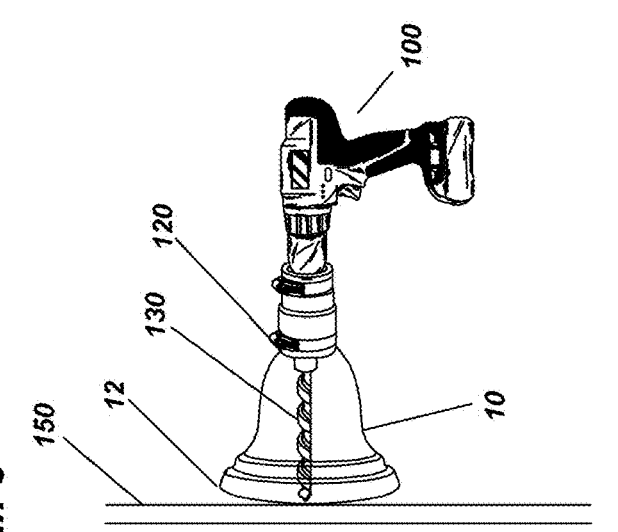
FIG. 3A is a pictorial view of the bell-shaped housing attached to the portable drill positioned adjacent a vertical wall.
Figure 3B:
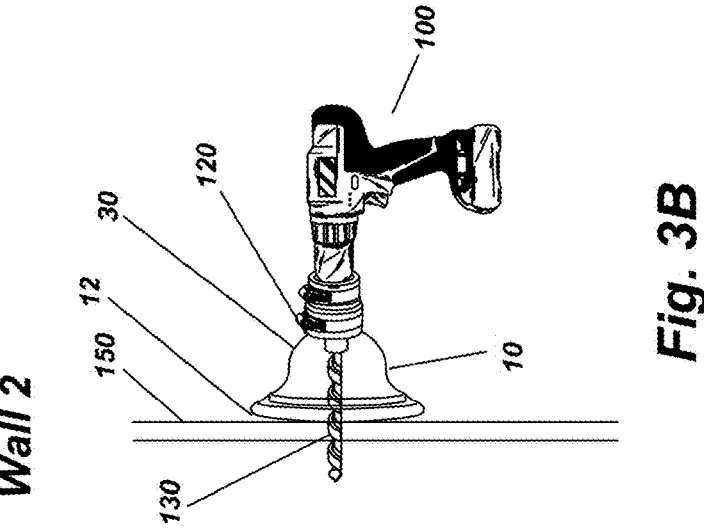
FIG. 3B is a pictorial view of the bell-shaped housing positioned against the vertical wall.
Figure 3C:
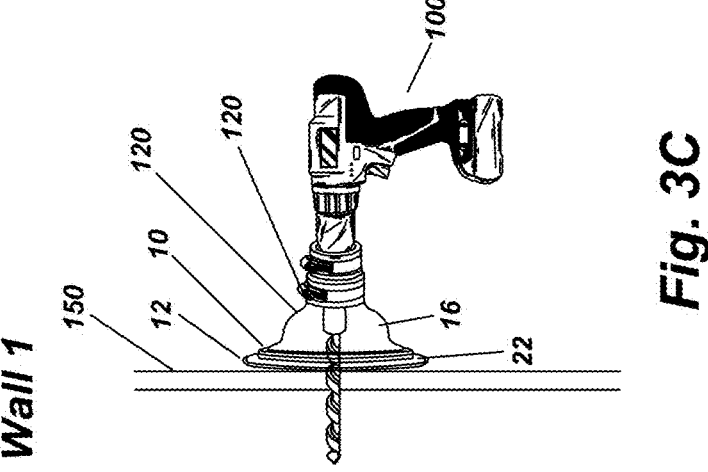
FIG. 3C is a pictorial view of the bell-shaped housing partially compressed against the vertical wall.

Referring to FIG. 3A, depicted is the portable drill 100 with the bell-shaped housing 10 coupled to the torque adjustment collar 120 by the connection sleeve 30. The housing 10 having the end 12 in a position wherein a mounted drill bit 130 is about to engage a wall 150. Referring to FIG. 3B, depicted is the portable drill 100 with the bell-shaped housing 10 coupled to the torque adjustment collar 120 by the connection sleeve 30 and engaging wall 150 wherein the drill bit 130 is causing particle debris by the mere drilling action. FIG. 3C depicts the portable drill 100 with the bell-shaped housing 10 coupled to the torque adjustment collar 120 by the connection sleeve 30 and engaging wall 150 wherein the drill bit 130 is causing particle debris by the drilling action and the side wall 16 is compressing as the drill is forced further into the wall 150. The compression of the side wall 16 allows the end 12 to maintain contact with the wall 150 at all times, thereby trapping the drilling debris particles within the housing 10. The lip 22 will keep the material within the housing 10 when the edge 12 is retracted from the wall 150.

Figure 4:
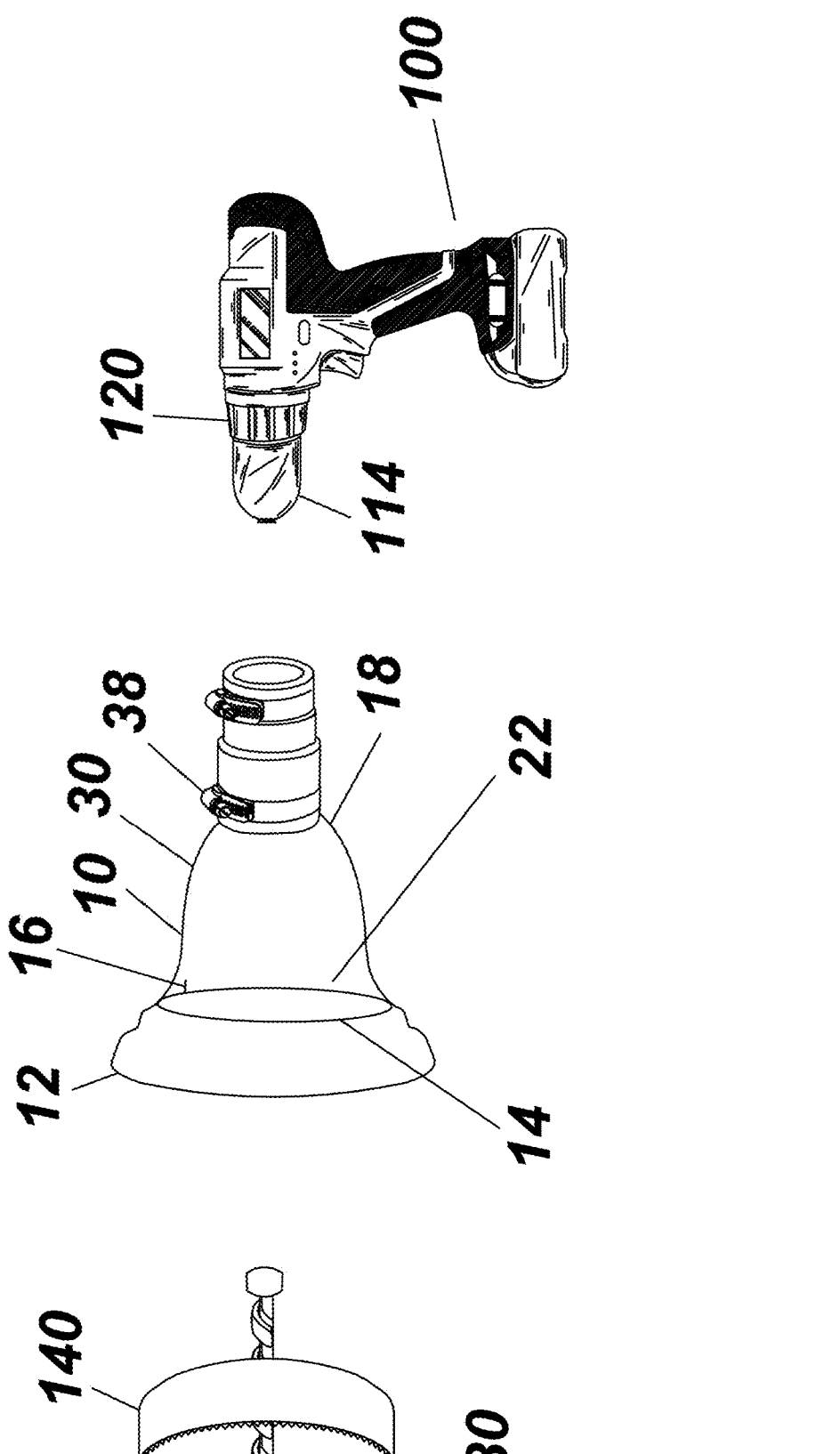
FIG. 4 is an exploded view of the bell-shaped housing, hole saw, and portable drill.

FIG. 4 is an exploded view depicting the portable drill 100, bell-shaped housing 10 and in this depiction the use of a hole saw 140. The hole saw 140 is primarily used for creating holes used for such items as recessed lighting in ceilings, door handle attachments, pipe routing and so forth. It is noted that the bell-shaped housing 10 has an enlarged first end 12 so as to readily accept the hole saw 140. Typically, a drill 130 attaches to the chuck 114 to provide alignment for the hole saw 140. The flexible sidewall 16 assuring concealment of the drill 130 and hold saw 140 during a drilling procedure. When the procedure is positioned horizontally, the lip 22 stops the cutting particles from exiting the housing when the housing is removed from the horizontally positioned procedure.

The operator can use any size drill bit for any application. This saves the operator time by eliminating the setup time of changing out components, eliminates the chance of losing critical components, maximizes stability and allow for one hand use, and eliminates the chance of overheating from the friction created by contact with moving parts.

Figures 5, 6:
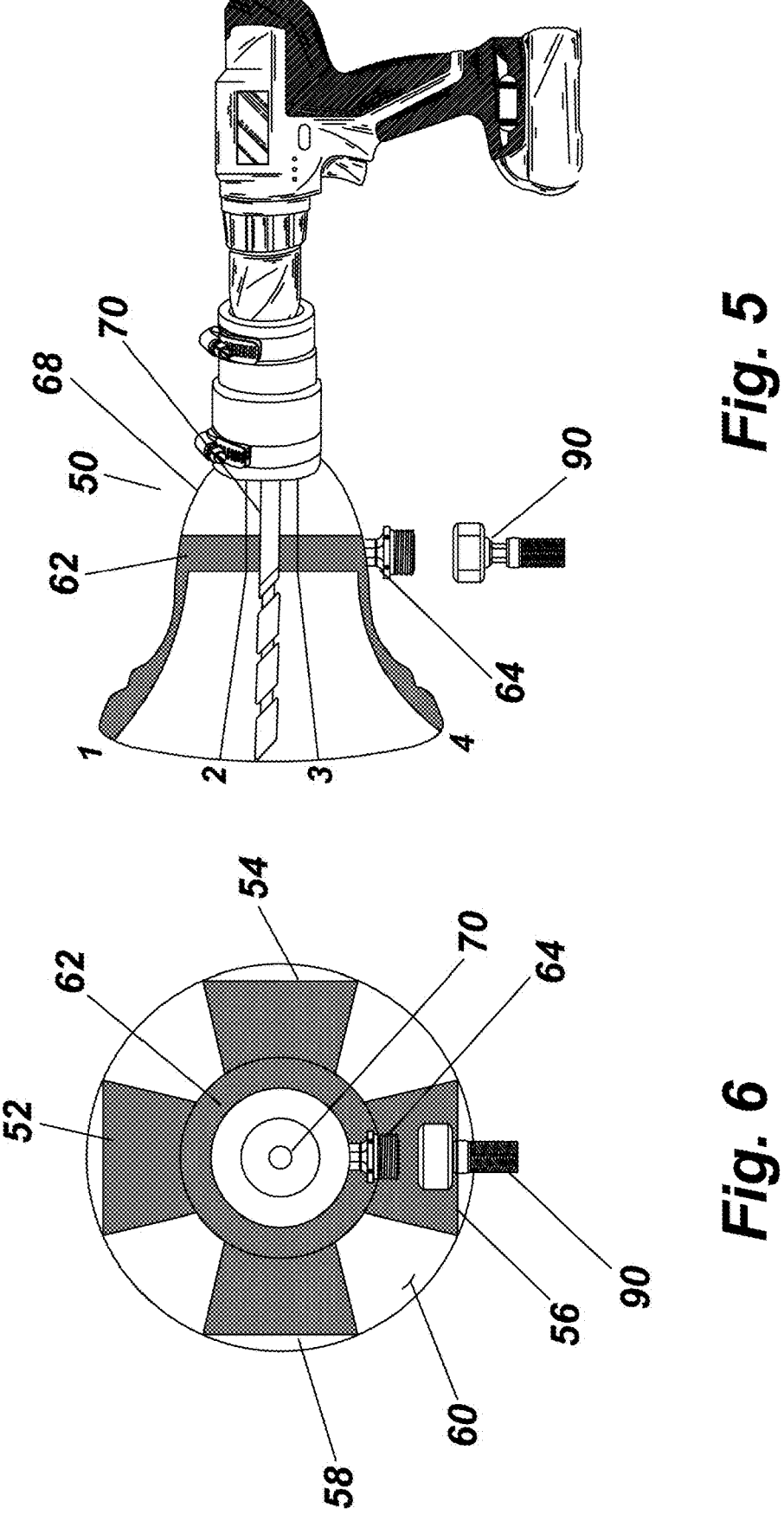
FIG. 5 is a cross sectional side view of the bell-shaped housing with a suction channel.
FIG. 6 is an end view of the bell-shaped housing of FIG. 5.

Referring now to FIGS. 5 and 6, depicted is the housing 50 having suction channel 52, 54, 56, and 58 which are preferably equally spaced. Each suction channel is separated from the inner surface 60 by about .25 inch and fluidly coupled to an adapter 62 having a port 64 that extends through the side wall 68 of the housing 50. The port 64 is available for coupling to a vacuum source 90 drawing a vacuum from a conventional wet/dry vacuum commonly found in both commercial and residential settings.

The flexible material forming the side wall 60 compresses as the drill bit 70 goes further into the surface being drilled. The housing 50 then returns to its original shape as the electric drill is pulled away from the surface being drilled. The housing 50 is transparent to give the operator full visibility while drilling. The vacuum drawing the debris from the housing 50 allowing the operator to maintain clarity of view during the drilling procedure.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited possessing only those one or more features. Furthermore, a device or structure that is configured in a certain way is configured in at least that way but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope.

Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A drilling attachment device for a portable drill having a torque collar, said attachment device for particle collection comprising:

a flexible transparent housing having a continuous sidewall with an inner surface and an outer surface, and a first end with a first diameter decreasing in diameter to a second end with a second diameter forming a bell-shape, said housing includes four equally spaced suction channels having a common adapter with a port that extends through the housing sidewall wherein said port is constructed and arranged to secure to a conventional wet/dry vacuum source;

a sleeve having a proximal end secured to said second end and a distal end releasably attached to said torque collar of said portable drill; and a clamp coupling said sleeve to said torque collar;

wherein rotation of said housing changes the torque of said portable drill; and wherein a drilling tool is coupled to the portable drill within said flexible housing whereby said flexible housing encompasses a surface area to be drilled to catch particles generated by a drilling procedure.

2. The drilling attachment device according to claim 1 including a lip formed along said inner surface of said housing juxtapositioned to said first end wherein said lip is sized to inhibit particle debris from falling out of the housing when a horizontal drilling procedure is performed.

3. The drilling attachment device according to claim 1 wherein said clamp coupling includes a thumbscrew to cause toolless compression of said sleeve to said torque collar.

4. The drilling attachment device according to claim 1 wherein said housing is constructed of a plastic or rubber material.

5. The drilling attachment device according to claim 1 wherein said housing is constructed of silicone rubber.

6. The drilling attachment device according to claim 1 wherein said suction channel is spaced apart from said inner surface of said housing by about .5 inches.

* * * * *